(12) United States Patent
Dold et al.

(10) Patent No.: US 8,415,596 B2
(45) Date of Patent: Apr. 9, 2013

(54) METHOD AND APPARATUS FOR DETERMINING A LOCATION OF A FLYING TARGET

(75) Inventors: Raimund Dold, Ueberlingen (DE); Thomas Kuhn, Heiligenberg (DE); Wilhelm Hinding, Ueberlingen (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 210 days.

(21) Appl. No.: 13/011,271

(22) Filed: Jan. 21, 2011

(65) Prior Publication Data

US 2011/0174917 A1  Jul. 21, 2011

(30) Foreign Application Priority Data

Jan. 21, 2010 (DE) .......................... 10 2010 005 199

(51) Int. Cl.
*F41G 7/22* (2006.01)
*F41G 7/00* (2006.01)

(52) U.S. Cl. ................ 244/3.15; 701/1; 701/3; 244/3.1; 244/3.16; 244/3.19; 342/61; 342/62; 342/175; 342/195; 382/100; 382/103

(58) Field of Classification Search ............ 244/3.1–3.3, 244/75.1, 76 R, 175, 189, 190; 89/1.11; 701/1, 3; 382/100, 103; 342/52–68, 89, 342/90, 175, 176, 179, 195
See application file for complete search history.

(56) References Cited

U.S. PATENT DOCUMENTS

| 3,952,208 | A | * | 4/1976 | Desvignes et al. ........... 244/3.16 |
| 3,986,682 | A | * | 10/1976 | Dryden ........................ 244/3.17 |
| 4,522,356 | A | * | 6/1985 | Lair et al. ..................... 244/3.15 |
| 4,738,411 | A | * | 4/1988 | Ahlstrom et al. ............ 244/3.15 |
| 5,008,543 | A |  | 4/1991 | Bertrand et al. |
| 5,206,452 | A | * | 4/1993 | Stamper et al. ................. 89/1.11 |
| 5,240,207 | A | * | 8/1993 | Eiband et al. ................. 244/190 |
| 5,341,143 | A | * | 8/1994 | Reis et al. ..................... 244/3.16 |
| 5,443,227 | A | * | 8/1995 | Hsu .............................. 244/3.12 |
| 5,521,817 | A | * | 5/1996 | Burdoin et al. .............. 244/3.14 |
| 5,855,339 | A | * | 1/1999 | Mead et al. .................. 244/3.11 |
| 6,653,972 | B1 | * | 11/2003 | Krikorian et al. ............... 342/62 |
| 6,817,568 | B2 | * | 11/2004 | Spate et al. .................. 244/3.15 |
| 6,910,657 | B2 | * | 6/2005 | Schneider .................... 244/3.11 |
| 7,032,858 | B2 | * | 4/2006 | Williams ..................... 244/3.15 |
| 7,159,500 | B2 | * | 1/2007 | John et al. ...................... 89/1.11 |

(Continued)

FOREIGN PATENT DOCUMENTS

| DE | 69007633 T2 | 10/1994 |
| WO | 0155743 A1 | 8/2001 |

*Primary Examiner* — Bernarr Gregory

(74) *Attorney, Agent, or Firm* — Laurence A. Greenberg; Werner H. Stemer; Ralph E. Locher

(57) ABSTRACT

A method for determining a location of a flying target included identifying and measuring the target by at least two seeker systems disposed at a distance from one another. The position of the target relative to at least one of the two seeker systems is determined from measurement data derived therefrom. The position of the target is measured inconspicuously and without active radiation, in that the seeker systems are data-networked, passive target tracking systems for missiles, which autonomously track the target and align the missile with the target. The measurement data determined by the data-networked seeker systems are combined, and the location of the target is determined from the combined data.

11 Claims, 2 Drawing Sheets

U.S. PATENT DOCUMENTS

| | | | |
|---|---|---|---|
| 7,338,009 B1 * | 3/2008 | Bobinchak et al. | 244/3.15 |
| 7,422,175 B1 * | 9/2008 | Bobinchak et al. | 244/3.15 |
| 7,631,833 B1 * | 12/2009 | Ghaleb et al. | 244/3.15 |
| 7,675,012 B1 * | 3/2010 | Bobinchak et al. | 244/3.15 |
| 7,947,936 B1 * | 5/2011 | Bobinchak et al. | 244/3.15 |
| 7,953,524 B1 * | 5/2011 | Roggendorf | 244/3.15 |
| 8,089,033 B2 * | 1/2012 | Zank et al. | 244/3.1 |
| 8,251,288 B2 * | 8/2012 | Woitalla et al. | 244/3.1 |
| 8,288,699 B2 * | 10/2012 | Romero et al. | 244/3.15 |
| 2003/0076488 A1 | 4/2003 | Arnold | |

* cited by examiner

METHOD AND APPARATUS FOR DETERMINING A LOCATION OF A FLYING TARGET

CROSS-REFERENCE TO RELATED APPLICATION

This application claims the priority, under 35 U.S.C. §119, of German patent application DE 10 2010 005 199.3, filed Jan. 21, 2010; the prior application is herewith incorporated by reference in its entirety.

BACKGROUND OF THE INVENTION

Field of the Invention

The invention relates to a method for determining the location of a flying target, in which the target is identified and measured by at least two seeker systems which are at a distance from one another, and the position of the target relative to at least one of the two seeker systems is determined from measurement data derived therefrom.

Guided missiles having a seeker head which is aligned with the target to be attacked are used to attack airborne targets, for example guided missiles, artillery rockets or aircraft. To do this, the seeker head normally produces an image of the target and its surrounding area, and an operator of the missile or of its carrier platform for launching the missile uses the image to manually search for the target, and passes the selected image area to the process means of the missile. The missile, to be precise its seeker system, uses the image characteristics of the target to detect the target, and tracks it autonomously, in order to make it possible for the missile to fly autonomously to the target, and to hit it, after it has been launched.

For complete alignment of a guided missile, it is worthwhile to also signal information relating to the range to the target to be attacked to the guided missile. This information is typically determined using an active sensor system, for example radar or a laser rangefinder. However, active sensor systems can themselves be detected easily and are therefore undesirably exposed in the battlefield. This considerably increases the potential danger to the sensor system and the operators of the sensor system.

SUMMARY OF THE INVENTION

It is accordingly an object of the invention to provide a method and a device for determining the location of a flying target which overcome the above-mentioned disadvantages of the heretofore-known devices and methods of this general type and which provides for an apparatus that is less conspicuous.

With the foregoing and other objects in view there is provided, in accordance with the invention, a method of determining a location of a flying target, which comprises:

providing at least two seeker systems positioned at a distance from one another, the seeker systems being data-networked, passive target tracking systems for missiles;

identifying and measuring the target with the at least two seeker systems, and autonomously tracking the target and aligning a missile with the target;

combining the measurement data determined by the seeker systems and determining a position of the target relative to at least one of the two seeker systems from the measurement data.

In other words, the objects relating to the method are achieved by a novel method in which the seeker systems are data-networked, passive target tracking systems for missiles, and the measurement data determined by them are combined, and the location of the target is determined from the combined data. The target tracking systems are passive, that is to say they are not able themselves to transmit any directional electromagnetic radiation when in a silent operating mode. In this case, the term passivity is not affected by normal thermal radiation or detector-specific signals or the like.

The range to the target can be determined by triangulation from the measurement data. Since the two seeker systems and the target form a triangle, it is sufficient to know the distance between the seeker systems and the angle between the flying target and the respective other seeker system, from the view of each seeker system. To do this, the two seeker systems have to find the bearing of the same target, and have to measure the line of sight to it at the same time. Both seeker systems expediently track the target, which is moving relative to them, while they are measuring the target. The measurement data can be combined at each location, for example at one of the locations of the passive seeker systems, or at some other suitable location. Furthermore, if the locations of the seeker systems and the alignment of the seeker systems are known in three dimensions, then the precise location of the flying target can be determined.

In order to determine the location, it is sufficient to determine the distance between the flying target and one of the seeker systems. In addition to range determination, location determination expediently also includes determination of the three-dimensional coordinates of the flying target at a predetermined point in space. The flying target can be measured by determining at least one three-dimensional information item of the flying target relative to both seeker systems, for example angle information. Target tracking systems are expediently systems which can autonomously track the target and, in particular, can align a missile with the target, in which case, it is sufficient for alignment to align any element of the missile with the target, for example seeker optics.

The seeker systems can expediently move with respect to one another and, for example, are distributed between two vehicles. The vehicles may be ground vehicles, watercraft or aircraft. It is likewise possible for one seeker system to be positioned on the ground and for the second seeker system to be in the air, for example in an aircraft, a guided missile or the like.

In one advantageous embodiment of the invention, at least one of the seeker systems is part of a carrier platform from which at least one missile is launched. Systems for ground-based air defense can be distributed between a number of vehicles, which are positioned distributed in the terrain. If at least two seeker systems are available on different vehicles, this allows the location of the flying target to be determined in a "silent mode". In this case, the carrier platforms, that is to say the launches, can be located precisely anywhere in the battlefield.

It is also advantageous for the seeker system on the carrier platform to be provided in addition to a seeker system in the missile to be launched. This embodiment has the advantage that the missile can be aligned with the target even when it itself has no view of the target. In this case, the seeker system in the carrier platform can detect and track the target, and can transfer target data to the missile. If the data is suitably selected, the seeker system in the missile can detect the target as such on the basis of the transferred target data, while it has no view of the target. For example, it is possible to simulate the missile itself being able to view the target to be tracked, such that the missile can at this stage carry out preparatory actions for launching—even when it cannot itself view the target since, for example, it is stored in a closed container. The seeker system in the missile can in this way detect the target even when in a closed container, thus providing a lock-on before launch capability (LOBL capability).

The target data must adequately describe the target, and may be any desired data which satisfies this requirement. The target data may be image data or data from image processing. Image data from a seeker system on the carrier platform is particularly suitable, in particular an image of the target recorded by the seeker system in the carrier platform. Alternatively or additionally, the target data may be data which was determined from evaluation of an image recorded by the seeker system in the carrier platform. Data can be used relating to the direction and/or movement of the target, and/or image data of the target, such as an intensity, shape or an extent of the target. The target data transferred to the missile from the carrier platform is expediently the same data which the seeker system in the missile would produce if it were at the same point as the seeker system in the carrier platform.

The carrier platform may be a ground-based launch site for the missile, for example a goods-vehicle trailer, or an aircraft in which the missile is mounted such that it can be launched, in order to provide good aircraft camouflage.

It is also advantageous for a missile to be launched from a carrier platform, and for one of the two seeker systems to be part of the missile, and for the second seeker system to be part of the carrier platform. This allows the location of the target to be determined from just a single vehicle, once the missile has been launched from that vehicle. This provides the necessary distance between the two seeker systems to allow the location to be determined by triangulation. The measurement data from the seeker system on the carrier platform is expediently transmitted to the seeker system in the missile, thus allowing data fusion to be carried out at the location of the missile, as a result of which the missile knows the range to the target being aimed at.

The location of the target can be determined at an early stage, if both seeker systems are each part of a carrier platform from which missiles are in each case launched. An approaching target can be identified, measured and attacked at an early stage, for example by a group of vehicles.

In order to improve the defense success probability, it is advantageous to use both seeker systems to determine a flight path and an impact point on the target. If the impact point is at a location which is not dangerous, then the attack can be cancelled, while a dangerously approaching target can be attacked with priority, for example simultaneously from a plurality of carrier platforms. In this case, it is advantageous to use the flight path to determine which of the two carrier platforms will be used for defense against the flying target. It is advantageous to use that carrier platform for defense against the flying target which is closest to the impact point on the target. Since the line-of-sight angle relative to this carrier platform changes least, it is best to carry out the attack from this carrier platform.

A further advantageous embodiment of the invention provides for these seeker systems to be part of a group of vehicles comprising at least three vehicles each having a carrier platform for launching missiles, which are linked to one another via a data network, and for the location to be determined locally in at least two of the vehicles. The central data fusion, evaluation and determination of the location of the target mean that the network will remain functional even if individual network nodes fail, for example because they have been hit. It is possible to access one of the nodes at any time, such that the determined position of the target or its range to each node point can be known.

With the above and other objects in view there is also provided, in accordance with the invention, an apparatus for determining a location of a flying target, comprising:

at least two passive seeker systems disposed at a distance from one another; and at least one processing device connected to the seeker systems, configured to measure a position of the target from measurement data acquired by the seeker systems, and configured to determine the position of the target relative to the at least two seeker systems from the measurement data;

wherein the seeker systems are data-networked, passive target tracking systems for missiles configured to autonomously track the target and to align the missiles with the target.

In other words, the objects relating to the apparatus are achieved by an apparatus for determining the location of a flying target having at least two passive seeker systems which are at a distance from one another, and having at least one process means which is provided to measure the position of the target from data from both seeker systems, and to determine the position of the target relative to the two seeker systems from the measurement data. It is proposed that, according to the invention, the seeker systems are data-networked, passive target tracking systems for missiles which are provided to autonomously track the target and to align the missiles with the target. Passive location determination can be achieved by simple means, such that the apparatus remains well concealed.

Other features which are considered as characteristic for the invention are set forth in the appended claims.

Although the invention is illustrated and described herein as embodied in a method and apparatus for determining the location of a flying target, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The drawing and the description contain numerous features in combination, which a person skilled in the art will expediently also consider individually, and will combine to form worthwhile further combinations.

DETAILED DESCRIPTION OF THE INVENTION

Figure 1:
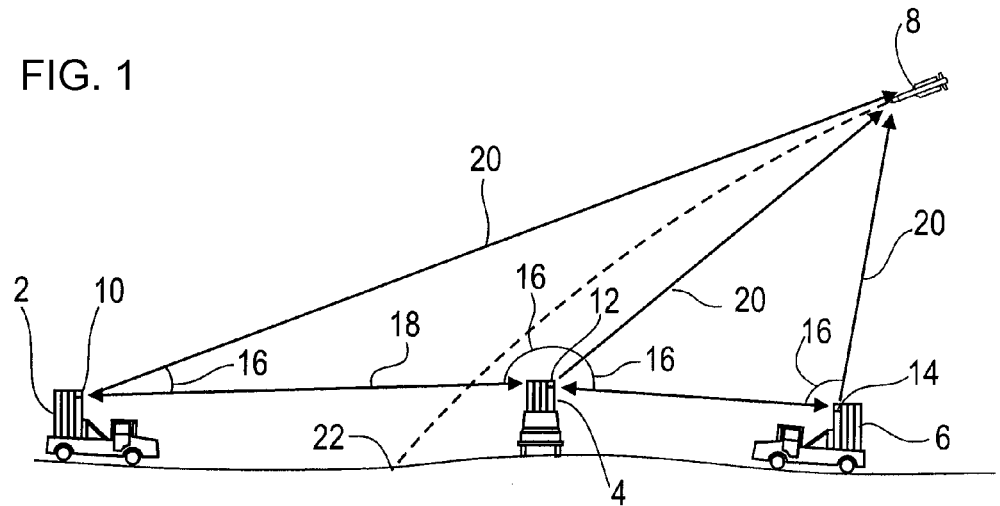
FIG. 1 is a diagram of a plurality of vehicles, distributed over a terrain, each having a carrier platform for launching missiles.

Referring now to the figures of the drawing in detail and first, particularly, to FIG. 1 thereof, there is shown a group of vehicles which each have a carrier platform 2, 4, 6 for launching a plurality of missiles. Each carrier platform 2, 4, 6 is fitted with 16 containers, in each of which one missile is completely enclosed, such that it is protected against external influences, such as dirt or radiation, and cannot view the outside world.

Each of the missiles has a seeker head with a passive seeker system, which is sensitive in the infrared spectral range and is prepared for detection and tracking of a target 8. The seeker system is illustrated in more detail in FIG. 4 and will be described in greater detail with reference to FIG. 4. The same seeker system 10, 12, 14 as that on each missile is additionally provided on each carrier platform 2, 4, 6.

The seeker systems 10, 12, 14 are all networked with one another for signalling purposes, such that they can interchange their position and target data. Furthermore, the carrier platforms 2, 4, 6 are equipped with receivers to receive position data, for example GPS data, as a result of which their positions are known.

If at least one of the seeker systems 10, 12, 14 identifies a target 8—the target 8 in FIG. 1 is an approaching artillery rocket—then it signals this to the other seeker systems 10, 12, 14. The seeker systems 10, 12, 14 direct their seeker optics at the target 8, and track it. In order to determine the range between the target 8 and a predetermined location, for example one of the seeker systems 10, 12, 14, the target 8 is measured by the seeker systems 10, 12, 14. For this purpose, the seeker systems 10, 12, 14 each measure the relative angle 16 between their line of sight to the target 8 and a further predetermined direction, for example an absolute direction or to an adjacent seeker system 10, 12, 14, as is indicated in FIG. 1. The relative angles 16 are solid angles in three-dimensional space, and each consist of a two-dimensional unit vector with two polar coordinate elements.

The range 20 between the target 8 and at least two seeker systems 10, 12, 14 is determined from the relative angles 16 from at least two seeker systems 10, 12, 14 and the distance 18 between them. The process of alignment of the missiles from the corresponding carrier platforms 2, 4, 6 with the target 8 now includes not only the direction of the target 8 but also the distance from the carrier platforms 2, 4, 6 and the target. In another embodiment of the invention, the location coordinates of the seeker systems 10, 12, 14 are also used to determine the position of the target 8. The network therefore knows the absolute location of the target 8, in addition to the range.

The velocity of the target 8, its flight trajectory and, therefrom, its predicted impact point 22 are calculated from the change in the location of the target 8 over time. In FIG. 1, the impact point 22 is close to the carrier platform 4 which is that one of all the carrier platforms 2, 4, 6 which is closest to the impact point 22. This carrier platform 4 is therefore assigned to attack the target 8. The carrier platform 4 aligns one of its missiles with the target 8, for example by passing control commands to the missile to align its flight with the target 8. It is likewise possible to align the seeker optics of the seeker system in the missile with the target 8 even before the missile has been launched from the closed container. Before, during or after alignment, the missile is launched, flies to the target 8, and attacks it. The selection of the carrier platform 2, 4, 6 to attack the target 8, and the determination of the location of the target 8, can be carried out centrally in one vehicle, or locally in all or a number of the vehicles.

Figure 2:
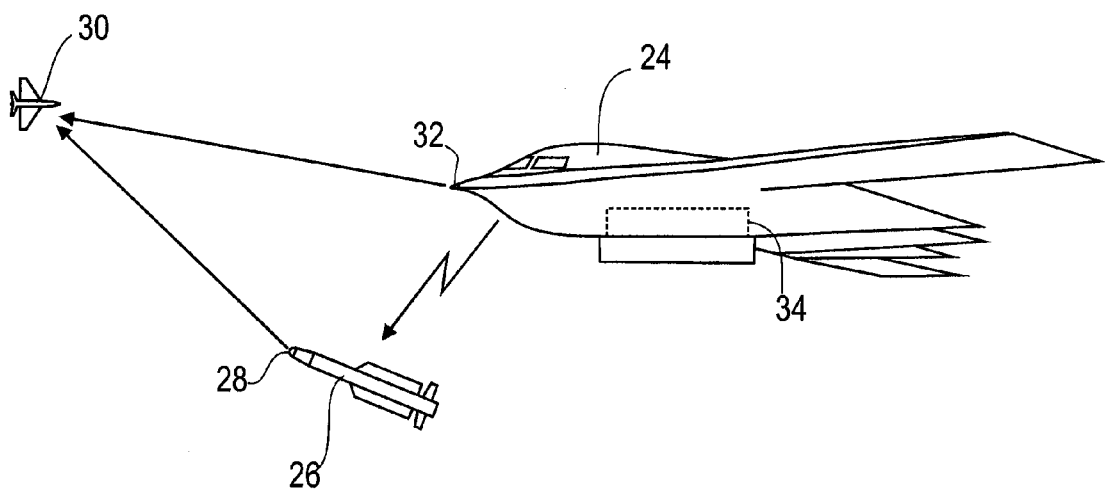
FIG. 2 shows a missile that has been launched from an aircraft.

FIG. 2 illustrates a further exemplary embodiment. A missile 26 has been launched from an aircraft which is used as a carrier platform 24 for the missile 26. Its seeker head includes a seeker system 28 which is aligned with the target 30. A seeker system 32 which is arranged on the nose of the carrier platform 24 is likewise aligned with the target 30. The target 30 is measured from both seeker systems 28, 32, analogously to the description relating to FIG. 1. The carrier platform 24 transmits its measuring results to the missile 26, as is indicated in FIG. 2, and the missile 26 calculates the range from it to the target 30, and in particular to the absolute location of the target 30, by data fusion from both measurement data items.

In a further exemplary embodiment, the location of the target 8, 30 can also be determined using only one of the carrier platforms 2, 4, 6 from FIG. 1, by viewing the target 8, 30, launching the missile 26 and measuring the target 8, 30 as described with reference to FIG. 2.

Figure 3:
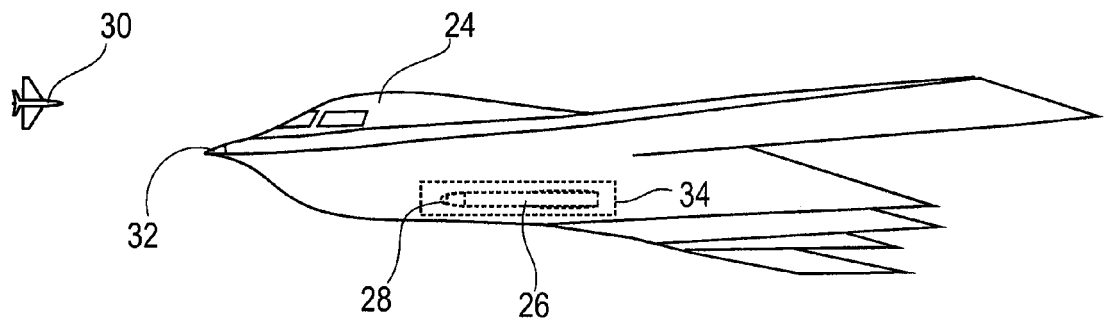
FIG. 3 shows the missile still within the aircraft.
Figure 4:
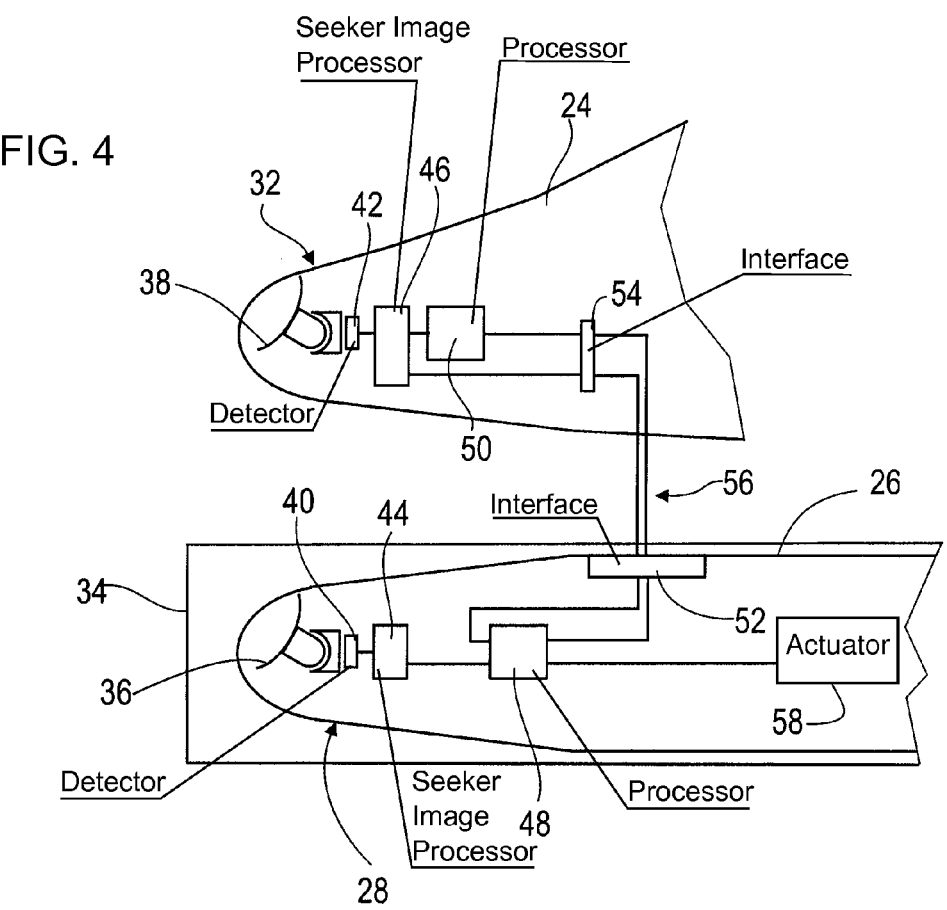
FIG. 4 is a schematic diagram of seeker systems, linked to one another, in the aircraft and in the missile.

FIG. 3 shows the missile 26 still in a closed container 34 on the aircraft, even before the missile 26 has been launched. FIG. 4 shows the seeker systems 28, 32 in the aircraft and the missile 26, which is still located in the aircraft, in more detail. The description relating to FIGS. 3 and 4 can be applied analogously to a missile in a carrier platform 2, 4, 6 as shown in FIG. 1.

The seeker systems 28, 32 each contain seeker optics 36, 38 with lenses and/or mirrors, a detector 40, 42, seeker image processing 44, 46, and a process means 48, 50 for target detection, target tracking and for controlling actions. The seeker systems 28, 32 are each connected to one another by a respective interface 52, 54 for signalling purposes. The link is provided, for example, via a cable 56 with a weak point, while the cable 56 is torn off the carrier platform 24 when the missile 26 is launched.

In a first embodiment, the seeker optics 36, 38 are identical, as are the detectors 40, 42. This results in identical images being formed on the detectors 40, 42—assuming the same position and alignment in three dimensions—and being processed by the seeker image processing means 44, 46, which can likewise be the same. This results in the same image data and/or the same data being output from the image processing from the seeker image processing means 44, 46, and being supplied to the process means 48, 50. The image processing means 46 passes its data to the process means 50 which, for example, passes on the image recorded by the seeker system 32 to a pilot of the carrier platform 24, to be precise to a display means for the pilot. However, the image or the image data can also be transferred via the interfaces 52, 54 to the process means 48 as target data, which process means 48 has two, for example symmetrical, inputs. The images or to be precise the image data, from both seeker image processing means 44, 46, are or is therefore available to the processing means 48, in which case the images and/or image data may be identical. In this embodiment, the target data is therefore image data, that is to say data which contains information relating to an image. In other embodiments, the target data may be other data, for example data which has been obtained from image processing. In any case, the target data is data which describes the target.

As is illustrated in FIG. 3, the missile 26 is enclosed in the container 34, such that its seeker head and its seeker optics 36 contained therein has no visual contact with the target 30. Nevertheless, an image is available to the processing means 48, which image the seeker system 28 in the missile 26 would itself produce if it had a free view of the target 30, apart from a possible small image offset resulting from the different positions of the seeker systems 28, 32 on or in the carrier platform 24. The free view of the target 30 is therefore simulated for the seeker system 28, as a result of which the seeker system 28 reacts in precisely the same way as if it itself has a free view of the target 30.

One of these reactions is for the processing means 48 to detect the target 30 on the basis of the image data or images from the seeker system 32. This results in the target being detected by the missile 2, to be precise its seeker system 12, even before it has a free view of the target 8 for the first time. A further action is for the target 30 to be tracked by the seeker system 28 in the missile 26 during the movement of said target 30 relative to the carrier platform 24. For this purpose, the target 30 is tracked in the image by the process means 48, which passes control commands to the seeker optics 36, as a result of which the latter is aligned with the target 30. The control data is obtained analogously to the way in which the control data for the seeker optics 38 is obtained by the process means 50 in the carrier platform 24. The seeker optics 36 in the missile 26 are therefore simultaneously slaved with the seeker optics 38 in the carrier platform 24. The simulation of the free view of the target 30 allows the missile 26 to carry out all actions which it will carry out itself if it has a free view of the target. For example, it can control an actuator 58 in order to carry out a movement.

After successful target detection, the missile 26 is launched from the carrier platform 24 and now autonomously tracks the target 30, as is illustrated schematically in FIG. 2. In order to launch the missile 26, it is ejected downwards out of the carrier platform 24, with the data link between the missile 26 and the carrier platform 24 being torn off. This initiates the process of unfolding the wings and starting of the rocket motor in the missile 26, as a result of which the latter now flies to the target 30 autonomously. The target tracking is in this case carried out with the aid of the seeker optics 36, which now have a free view of the target 30 and are therefore no longer aligned with the external target data from the carrier platform 24, with the target being tracked by its own target data from images of the target 30 that it has itself recorded.

The time for switching from the processing of external target data, for example external images, to the processing of the seeker system's 28 own target data is selected by the process means 48. In this case, it possible to choose the time at which the data link is torn off, or an earlier or later time. Independently of this, the target tracking by the process means 48 at the time of switching is carried out in error-tolerant mode in the same way as before and after switching, in order not to lose the target in the event of any possible image offset or changes in the target characteristics in the image. For example, it can be operated in the same mode which is chosen when the target 30 is concealed for a short time, and is then reacquired.

In a further embodiment of the invention, the seeker systems 28, 32 are not identical. This is worthwhile if different missiles 26, which have different seeker systems 28, are fired from the carrier platform 2, 4, 6, 24. In order to ensure the LOBL capability for all missiles 26 within the carrier platform 2, 4, 6, 24, that is to say when still in the "blind" state, the process means 50 in the aircraft or the carrier platform 2, 4, 6 selects appropriate data forms for transfer to the corresponding seeker system in the selected missile 26, thus resulting in sight simulation for each missile 26. After a missile 26 which is intended to be the next to be launched has been selected, the process means 50 knows the data relating to the seeker system 28 of the selected missile 26. In this case, the seeker system 32 is designed, in particular with respect to its seeker optics 38 and the detector 42 as well as the seeker image processing 46, such that target data, for example an image or image data, can be made available to each of the missiles 26, which the corresponding missile 26, to be precise its seeker system 28, would itself have produced if it had had a free view of the target 8, 30. In this case, each missile 26 is provided with an appropriate interface 52 for data coupling to the seeker system 32 of the carrier platform 2, 4, 6, 24. Before a missile 26 is launched, data is now made available to each missile 26 providing the process means 48 in the missile 26 with the capability to use the simulation of the view of the target 8, 30 to carry out the corresponding actions which it would have carried out if it as itself had a free view of the target 8, 30.

The invention claimed is:

1. A method of determining a location of a flying target, which comprises:
    providing at least two seeker systems positioned at a distance from one another, the seeker systems being data-networked, passive target tracking systems for missiles;
    identifying and measuring the target with the at least two seeker systems, and autonomously tracking the target and aligning a missile with the target;
    combining the measurement data determined by the seeker systems and determining a position of the target relative to at least one of the two seeker systems from the measurement data.

2. The method according to claim 1, wherein at least one of the seeker systems is part of a carrier platform from which at least one missile is launched.

3. The method according to claim 2, wherein the seeker system on the carrier platform is provided in addition to a seeker system in the missile to be launched.

4. The method according to claim 3, which comprises, with the seeker system mounted on the carrier platform, aiming the carrier platform at the target, generating target data and transferring the target data to the seeker system of the missile to be launched, and, with the seeker system in the missile, detecting the target only on the basis of the target data thus transferred while the seeker system in the missile has no view of the target.

5. The method according to claim 1, which comprises launching a missile from a carrier platform, with one of the two seeker systems being part of the missile, and the second seeker system being part of the carrier platform.

6. The method according to claim 1, wherein both seeker systems are part of a carrier platform from which missiles are in each case launched.

7. The method according to claim 6, which comprises using the flight path to determine which of the two carrier platforms will be used for defending against the flying target.

8. The method according to claim 1, which comprises determining a flight path and an impact point on the target with the aid of both seeker systems.

9. The method according to claim 8, which comprises using the flight path to determine which of the two carrier platforms will be used for defending against the flying target.

10. The method according to claim 1, wherein the seeker systems are part of a group of vehicles comprising at least three vehicles each having a carrier platform for launching missiles, and which comprises lining the seeker systems to one another via a data network, and determining the location of the target locally in at least two of the vehicles.

11. An apparatus for determining a location of a flying target, comprising:
    at least two passive seeker systems disposed at a distance from one another;
    at least one processing device connected to said seeker systems, configured to measure a position of the target from measurement data acquired by said seeker systems, and configured to determine the position of the target relative to said at least two seeker systems from the measurement data;
    wherein said seeker systems are data-networked, passive target tracking systems for missiles configured to autonomously track the target and to align the missiles with the target.

* * * * *